(12) United States Patent
Nilson (10) Patent No.: US 10,870,477 B1
(45) Date of Patent: Dec. 22, 2020

(54) FOLDABLE ARM MECHANISM FOR ROTARY WING AIRCRAFT

(71) Applicant: FPV MANUALS LLC, Sarasota, FL (US)

(72) Inventor: Tim Nilson, Sarasota, FL (US)

(73) Assignee: FPV MANUALS LLC, Sarasota, FL (US)

( * ) Notice: Subject to any disclaimer, the term of this patent is extended or adjusted under 35 U.S.C. 154(b) by 712 days.

(21) Appl. No.: 15/473,817

(22) Filed: Mar. 30, 2017

Related U.S. Application Data

(60) Provisional application No. 62/318,637, filed on Apr. 5, 2016.

(51) Int. Cl.
| | | |
|---|---|---|
| *B64C 27/08* | (2006.01) | |
| *B64C 1/06* | (2006.01) | |
| *B64C 39/02* | (2006.01) | |
| *B64C 1/00* | (2006.01) | |

(52) U.S. Cl.
CPC .............. *B64C 1/063* (2013.01); *B64C 27/08* (2013.01); *B64C 39/024* (2013.01); *B64C 2001/0072* (2013.01); *B64C 2201/024* (2013.01); *B64C 2201/042* (2013.01); *B64C 2201/108* (2013.01); *B64C 2201/146* (2013.01)

(58) Field of Classification Search
CPC ..... B64C 1/30; B64C 1/063; B64C 2201/024; B64C 2201/027; B64C 2201/102; B64C 2201/108; B64C 2201/146; B64C 2201/0072; B64C 2201/042; B64C 39/024; B64C 27/08; Y10T 16/551; E05C 17/085; E05C 17/08; E05D 2011/1035
See application file for complete search history.

(56) References Cited

U.S. PATENT DOCUMENTS

| | | | |
|---|---|---|---|
| 8,052,081 B2* | 11/2011 | Olm ....................... | B64C 39/024 244/17.23 |
| 2015/0321755 A1* | 11/2015 | Martin .................... | B64C 27/50 244/17.23 |
| 2017/0327222 A1* | 11/2017 | He ........................... | B64C 1/06 |

* cited by examiner

*Primary Examiner* — Medhat Badawi
*Assistant Examiner* — Vicente Rodriguez
(74) *Attorney, Agent, or Firm* — Frijouf, Rust & Pyle, P.A.

(57) ABSTRACT

A folding device is disclosed for a rotary wing aircraft. The foldable device includes a plurality of pivots mounting a plurality of arms supporting driven propellers of the rotary wing aircraft. A projection and a detent resiliently cooperate for securing each of the plurality of arms in desired orientations relative to the rotary wing aircraft and for enabling each of the plurality of arms to rotate about the pivot into a folded position.

9 Claims, 9 Drawing Sheets

FOLDABLE ARM MECHANISM FOR ROTARY WING AIRCRAFT

CROSS-REFERENCE TO RELATED APPLICATIONS

This application claims benefit of U.S. Patent Provisional application No. 62/318,637 filed Apr. 5, 2016. All subject matter set forth in provisional application Ser. No. 62/318,637 is hereby incorporated by reference into the present application as if fully set forth herein.

BACKGROUND OF THE INVENTION

Field of the Invention

This invention relates to aircraft and more specifically to a foldable arm mechanism for rotary wing aircrafts.

Description of the Related Art

The popularity of remote remote-controlled aircraft has dramatically increased over the last several years. One of the most popular remote controlled aircraft is a rotary wing aircraft commonly referred to as a helicopter. These rotary wing aircraft am used by hobbyists and commercial enterprises for photographing, video recording as well as surveillance. Some companies are experimenting with delivering of goods through remotely controlled rotary wing aircraft.

In general, there are two types of remote controlled rotary wing aircraft. The first type of rotary wing aircraft is commonly referred to as a conventional helicopter aircraft. In the conventional helicopter aircraft type rotary wing aircraft, the rotor blade or blades are mounted within or above the aircraft frame or fuselage.

The second type of rotary wing aircraft is commonly referred to as quadcopter rotary wing aircraft. One type of quadcopter rotary wing aircraft is a H-type rotary wing aircraft. In the H-type rotary wing aircraft, a plurality of arms extend from the aircraft frame or fuselage with each of the plurality of arms supporting a motor rotating a rotor blade. The plurality of rotor blades provides lift and forward propulsion to the rotary wing aircraft. A differential in rotation of the plurality of rotor blades provide steering of the rotary wing aircraft.

Although the H type Rotary wing aircraft has many bandages over the conventional helicopter rotor wing aircraft, the plurality of extending arms of the H type rotary wing aircraft present certain difficulties during the operation, transportation and storage of the H type rotary wing aircraft.

Firstly, the extending arms of the H type rotary wing aircraft require a larger case for the transportation and storage of the H type rotary wing aircraft. Secondly, the extending arms of the H type rotary wing aircraft can be damaged in the event of an undesired collision or undesired landing of the H-type rotary wing aircraft.

Therefore it is an object of the present invention to overcome the difficulties of the H-type rotary wing aircraft and provide a rotary wing aircraft with foldable extending arms.

Another object of this invention is to provide a foldable arm mechanism for a rotary wing aircraft wherein the foldable arm mechanism does not appreciably add to the weight of the rotary wing aircraft.

Another object of the invention is to provide a foldable arm mechanism for a rotary wing aircraft wherein the proper orientation of each of the extending arms incorporated into the folding mechanism.

Another object of the invention is to provide a foldable arm mechanism for a rotary wing aircraft wherein each of the foldable arms may be readily returned to the proper orientation.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a folding device for a rotary wing aircraft comprising an aircraft frame having a horizontal surface. A frame pivot aperture is defined in the horizontal surface of the aircraft frame. An arm extends between an inner end and an outer end. An arm pivot aperture is located in the inner end of the arm. The outer end of the arm is adapted to mount a driven propeller. A pivot extends through the frame pivot aperture and the arm pivot aperture for pivotably mounting the arm to the aircraft frame. A projection extends from one of the aircraft frame and the arm. A detent is located on the other of the aircraft frame and the arm. A resilient mounting mounts one of the detents and the projection for enabling the projection to resiliently engage the detent for securing the arm in a desired orientation relative to the aircraft frame and for enabling the arm to rotate about the pivot into a folded position.

In a more specific embodiment, the projection extends from the aircraft frame and the detent is defined in the arm. A U-shaped slot is located in the horizontal surface of the aircraft frame defining a frame support extending from a proximal end to a distal end. The distal end of the frame support is flexible for defining the resilient mounting. The projection extends from the distal end of the frame support. Preferably, the U-shaped slot is sized concurrently with the aircraft frame and formed from a material to establish the distal end of the frame support for defining the resilient mounting. In one example, the frame support is integral with the aircraft frame as a one-piece unit. The frame is made of carbon fiber structure.

In another embodiment, the detent is defined in the inner end of the arm. An arcuate recess is disposed adjacent to the detent for facilitating rotation of the arm about the pivot. Optionally, a first and a second arcuate recess are disposed on opposed sides of the detent for facilitating rotation of the arm about the pivot in either rotational direction.

In still a more specific embodiment of the invention, the invention is incorporated into a folding device for a rotary wing aircraft comprising an aircraft frame having a lower and an upper frame horizontal surface. A lower and an upper frame pivot aperture is defined in the lower and upper horizontal surfaces of the aircraft frame, respectively. An arm extends between an inner end and an outer end. An arm pivot aperture is located in the inner end of the arm. The outer end of the arm is adapted to mount a driven propeller. A pivot extends through the lower and an upper frame pivot apertures and the arm pivot aperture for pivotably mounting the arm to the aircraft frame. A lower and an upper projection resiliently extends from the lower and upper horizontal surfaces of the aircraft frame. A lower and an upper detent are located proximate the first end of the arm for enabling the lower and upper projections to resiliently engaged the lower and upper detents for securing the arm in a desired orientation relative to the aircraft frame and for enabling the arm to rotate about the pivot into a folded position.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar numbers relate to similar parts throughout the several Figures of the drawings.

DETAILED DISCUSSION

Figure 1:
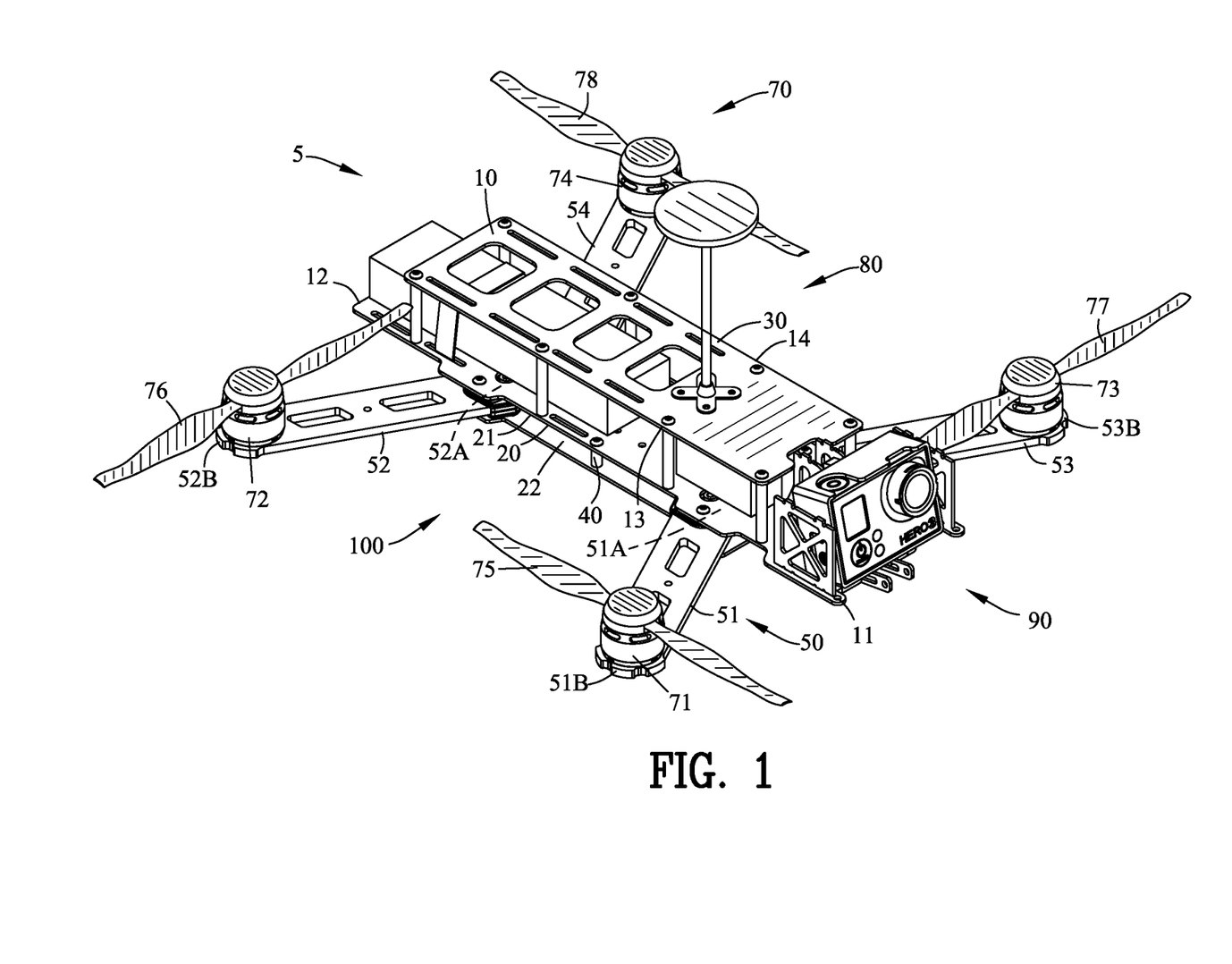
FIG. 1 is an isometric view of a rotary wing aircraft incorporating the present invention.
Figure 2:
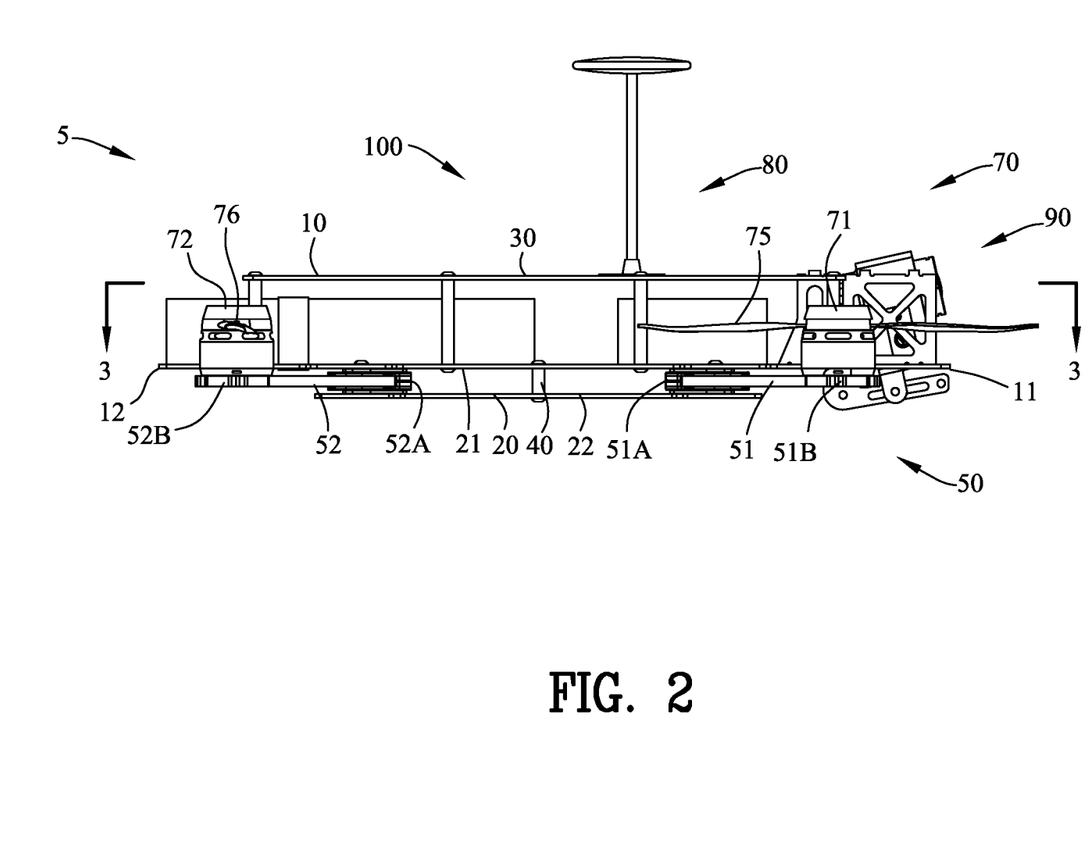
FIG. 2 is a side view of the rotary wing aircraft of FIG. 1.
Figure 3:
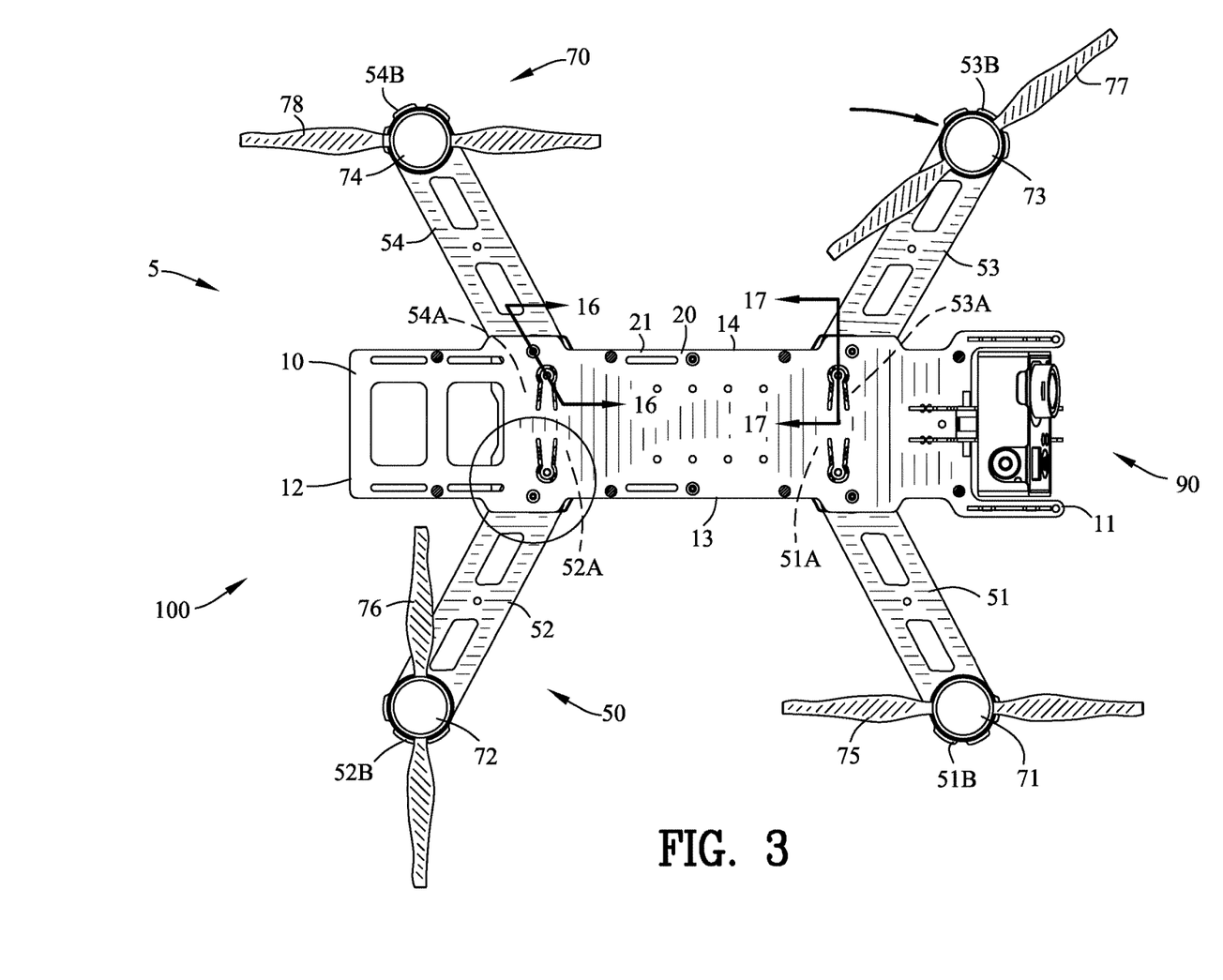
FIG. 3 is a view along line 3-3 in FIG. 2.

FIGS. 1-3 illustrate a rotary wing aircraft 5 incorporating the present invention. The rotary wing aircraft 5 is shown as an unmanned rotary wing aircraft but it should be understood that the present invention is applicable to other types of aircraft.

The rotary wing aircraft 5 comprises a frame 10 extending between a first and a second end 11 and 12 bounded by a first and a second edge 13 and 14.

The frame comprises a power frame 20 shown as a bottom frame 20 and a carrier frame 30 shown as a top frame. Although the power frame 20 has been shown as a bottom frame and the carrier frame 30 has been shown as a top frame, the arrangement may be reversed with the carrier. A plurality of resilient couplers 40 interconnect the power frame 20 to the carrier frame 30. The plurality of resilient couplers 40 isolate the power frame 20 from the carrier frame 30. The power frame 20 defines an upper power frame surface 21 and a lower power frame surface 22. Preferably, the power frame 20 is formed from a carbon fiber material.

The plurality of arms 50 shown as arms 51-54 extend from the power frame 20 in a pattern commonly referred to as an H frame pattern. Each of the plurality of arms 51-54 are connected to the power frame 20.

Each of the plurality of arms 50 extend between an inner end 51A-54A and outer end 51B-54B. The inner end 51A-54A of the plurality of arms 51-54 define pivot aperture 51C-54C. The pivot aperture 51C-54C of the plurality of arms 51-54 are in registry with frame pivot apertures 61-64, Pivots 65-68 extend through the pivot aperture 51C-54C and the frame pivot apertures 61-64 for pivotably mounting the plurality of arms 51-54 to the frame 10.

The outer ends outer end 51B-54B of the plurality of arms 50 support a plurality of electric motors 71-74 for driving a plurality of rotary blades 75-78. The plurality of electric motors 71-74 are individually controlled through electrical conductors (not shown) as should be well known to those skilled in the art.

Preferably, flight electronic components (not shown) enabling remote flight are mounted between the power frame 20 and the carrier frame 30. The flight electronics components may include an electronic flight control and transceiver and an optional GPS system as well as a battery for powering the aforementioned electronics. Typically, a flight camera is mounted to the carrier frame 30 for showing the actual flight direction and attitude of the rotary wing aircraft 5. The flight camera enables an operator to visually determine the flight direction and attitude to remotely fly the rotary wing aircraft 5.

Figure 4:
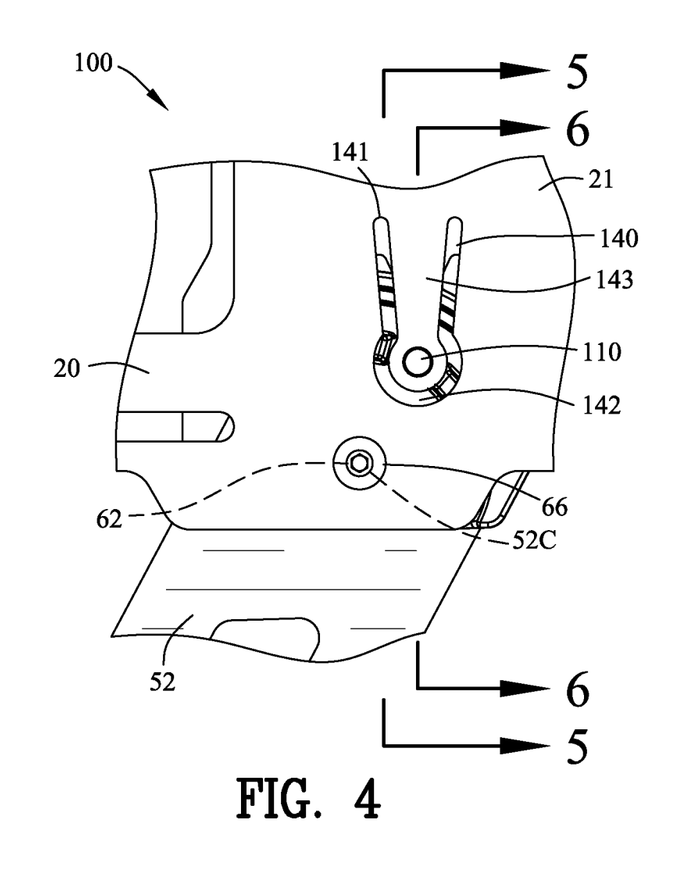
FIG. 4 is an enlarged top view of an encircled portion of FIG. 3 with an arm shown in phantom.

FIG. 4 is an enlarged top view of an encircled portion of FIG. 3 with the arm 52 shown in phantom. The present invention comprises a folding device 100 for enabling the plurality of arms 51-54 to rotate about the pivots 65-68 into folded positions. A projection 110 extends from one of the aircraft frame 10 and the arm 52. A detent 120 is located on the other of the aircraft frame 10 and the arm 52. A resilient mounting 130 mounts one of the projections 110 and the detent 120 for enabling the projection 110 to resiliently engage the detent 120 for securing the arm 52 in a desired orientation relative to the aircraft frame 5 and for enabling the arm 52 to rotate about the pivot 66 into a folded position.

Figure 5:
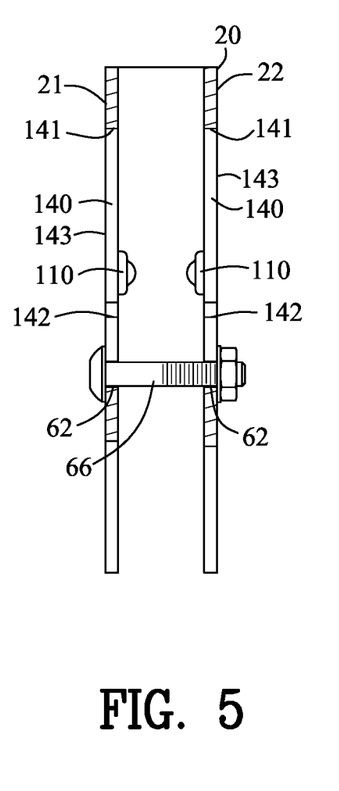
FIG. 5 is a sectional view along line 5-5 in FIG. 4.
Figure 6:
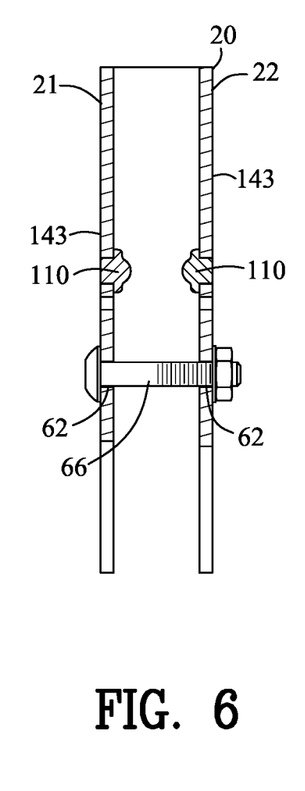
FIG. 6 is a sectional view along line 6-6 in FIG. 4.

FIGS. 5 and 6 are sectional views of FIG. 4 illustrating a U-shaped slot 140 in the aircraft power frame 20. The U-shaped slot 140 located in the horizontal surfaces 21 and 22 of the aircraft frame 20. The U-shaped slot 140 defines a frame support 143 extending from a proximal end 141 to a distal end 142. The distal end 142 of the frame support 143 is flexible for defining the resilient mounting 130. Preferably, the frame support 143 is integral with the aircraft frame 20 as a one-piece unit. In one example, the U-shaped slot 140 is sized concurrently with the material selected for the aircraft frame 20 to establish the distal end 142 of the frame support 143 for defining the resilient mounting 130. The projection 110 extends from the distal end 142 of the frame support 143. Preferably, the projection 110 is formed from a resilient polymeric material secured to the distal end 142 of the frame support 143. In the example, the projection 110 is resiliently secured to the distal end 142 of the frame support 143.

Figure 7:
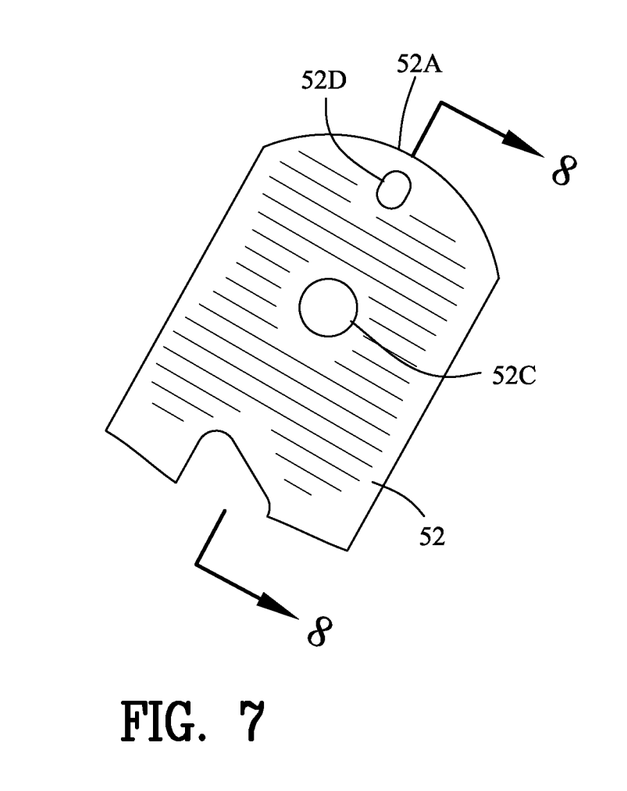
FIG. 7 is an enlarged top view of the encircled portion of FIG. 3 illustrating the arm shown in FIG. 4.
Figure 8:
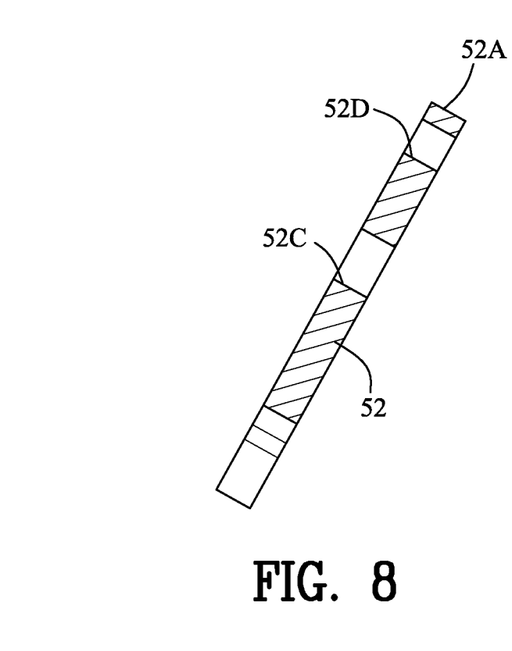
FIG. 8 is a sectional view along line 8-8 in FIG. 7.

FIGS. 7 and 8 are enlarged views of the encircled portion of FIG. 3 illustrating the arm 52 shown in FIG. 4. The second arm pivot aperture 52C is defined in the inner end 51 of the second arm 52. An index aperture 52D extends through the inner end 51 of the second arm 52.

Figure 9:
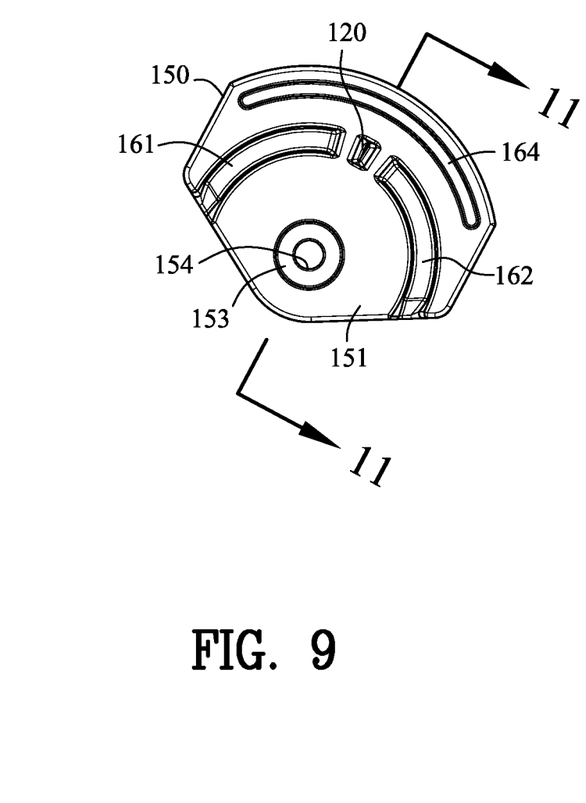
FIG. 9 is a top view of a first side of a detent plate.
Figure 10:
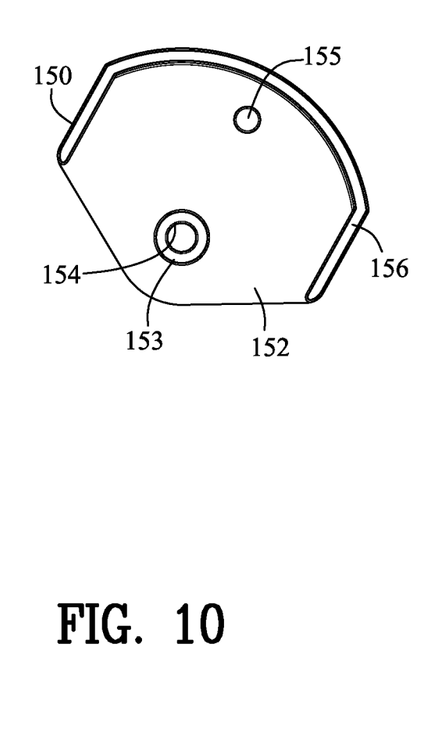
FIG. 10 is a bottom view of a second side of a detent plate.
Figure 11:
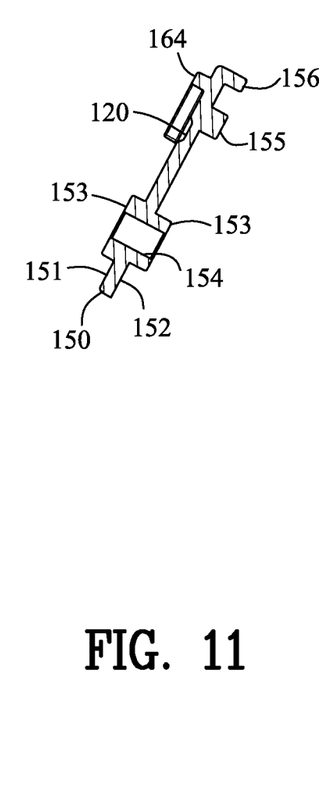
FIG. 11 is a side sectional view along line 11-11 in FIG. 9.

FIGS. 9-11 are various views of a detent plate 150 defining a first side 151 and a second side 152 of a detent plate 150. The detent plate 150 cooperates with the inner end 52A of the arm 52 to provide the detent 120 of the present invention.

FIG. 9 is a top view of a first side 151 of a detent plate 150 illustrating a detent plate boss 153 with a centrally disposed detent plate aperture 154.

FIG. 10 is a bottom view of a second side 152 of a detent plate 150 illustrating a detent plate boss 153 with a centrally disposed detent plate aperture 154. The detent plate boss 153 is received within the second arm pivot aperture 52C of the second arm 52.

FIG. 11 is a side sectional view along line 11-11 in FIG. 9. An index finger 155 extends from the second side 152 of the detent plate 150 for engaging with the index aperture 52D of the inner end 52A of the arm 52. A peripheral rim 156 extends from the second side 152 of the detent plate 150 for engaging with the edges of the inner end 52A of the arm 52.

The first side 151 of the detent plate 150 illustrates arcuate recesses 161 and 162 located on opposed side of the detent 120. The arcuate recesses 161 and 162 cooperate with the projection 110 to facilitate rotation of the arm 52 after the projection 110 is moved from the detent 120. An arcuate bearing 164 extends from the first side 151 of the detent plate 150. The detent plate boss 153 and the arcuate bearing 164 provide surfaces for rotational engagement with the frame 20.

Figure 12:
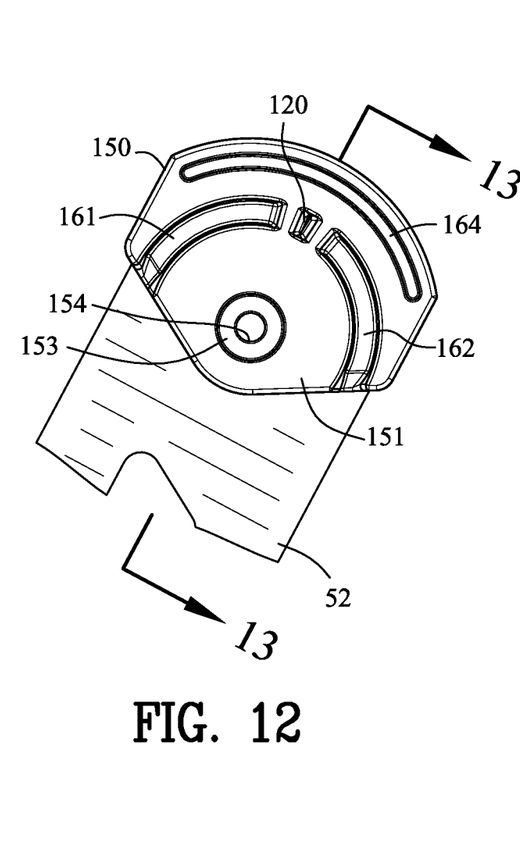
FIG. 12 is a top view of plural detent plates secured to the inner end of the arm of FIG. 7.
Figure 13:
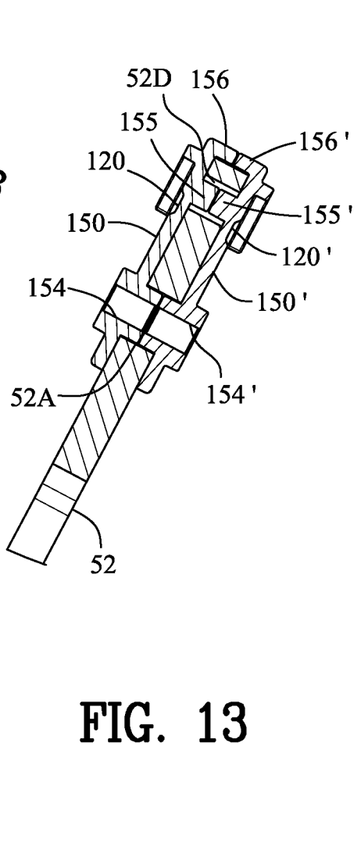
FIG. 13 is a sectional view along line 13-13 in FIG. 12.
Figure 14:
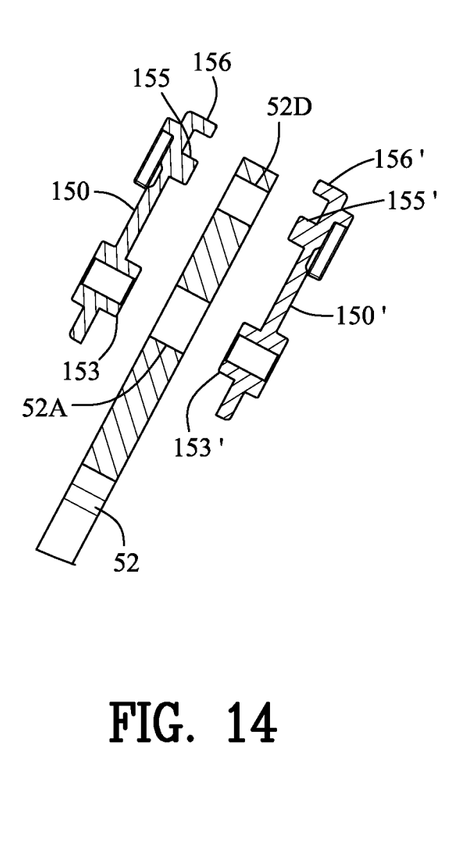
FIG. 14 is an exploded view of FIG. 13.

FIGS. 12-14 are various views of a detent plate 150 secured to the inner end 52A of the arm 52 of FIG. 7. In this example, plural detent plates 150 and 150' are secured to oppose sides of the inner end 52A of the arm 52 of FIG. 7. The plural detent plates 150 rotatably engage with the upper power frame surface 21 and the lower power frame surface 22. Specifically, the detent plate bosses 153 and 153' along with the arcuate bearings 164 and 164' provide surfaces for rotational engagement with the upper power frame surface 21 and the lower power frame surface 22.

Figure 15:
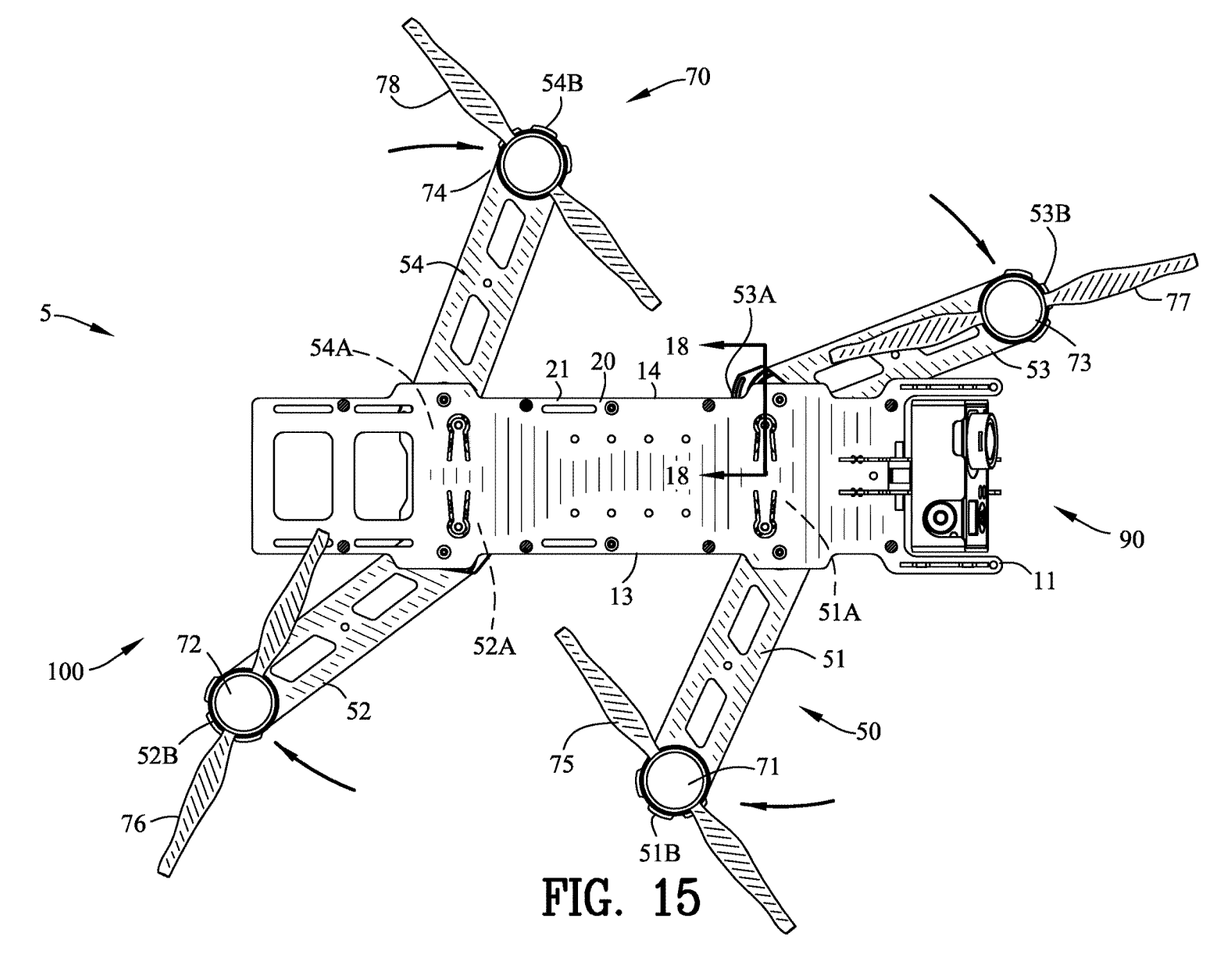
FIG. 15 is a top view of the rotary wing aircraft similar to FIG. 3 with the arms moved from the normal orientation.

FIG. 15 is a top view similar to FIG. 3 of the rotary wing aircraft 5 with the arms 51-54 moved from the normal operating position or orientation into a folded position or orientation. The folding of the arms 51-54 into the folded position may be the result of intentional folding to transport and store the rotary wing aircraft 5 or may be folded as a result of an undesired collision or undesired landing of the rotary wing aircraft 5.

Figure 16:
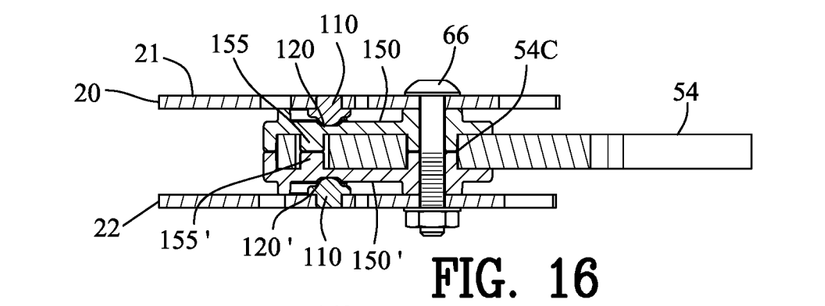
FIG. 16 is a view along line 16-16 in FIG. 3.

FIG. 16 is a view along line 16-16 in FIG. 3. The arm 54 is shown in the normal operating position. The projection 100 is retained resiliently within the detent 120 of the arm 54.

Figure 17:
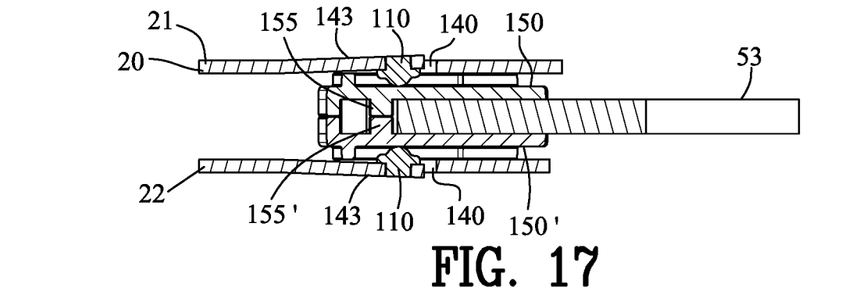
FIG. 17 is a view along line 17-17 in FIG. 3.

FIG. 17 is a view along line 17-17 in FIG. 3. The arm 53 is shown in the normal operating position. The projection 100 is retained resiliently within the detent 120 of the arm 53.

Figure 18:
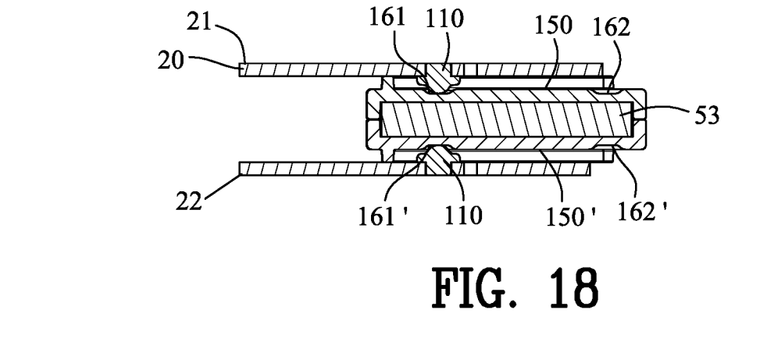
FIG. 18 is a view along line 18-18 in FIG. 15.

FIG. 16 is a view along line 18-18 in FIG. 15. The arm 53 is shown in clockwise folded position. The projection 100 has moved from the detent 120 and is located within the arcuate recess of the detent plate 150.

Although the folding device 100 has been shown with reference to the second arm 52, it should be understood that all of the arms 51-54 incorporate the folding device 100. Furthermore, the folding device 100 has been shown with plural detent plates 150 and 150' as an example, but the fold device 100 may incorporate only a single projection 110 and single detent 120. In another example, the detent 120 may be formed directly into the arms 51-54 without the need of a detent plate 150.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claims is:

1. A folding device for an aircraft, comprising:
an aircraft frame having a horizontal surface;
a frame pivot aperture defined in said horizontal surface of said aircraft frame;
an arm extending between an inner end and an outer end;
an arm pivot aperture located in said inner end of said arm;
said outer end of said arm adapted to mount a driven propeller;
a pivot extending through said frame pivot aperture and said arm pivot aperture for pivotably mounting said arm to said aircraft frame;
a projection extending from one of said aircraft frame and said arm;
a detent located on the other of said aircraft frame and said arm;
a resilient mounting for mounting one of said detent and said projection for enabling said projection to resiliently engage said detent for securing said arm in a desired orientation relative to said aircraft frame and for enabling said arm to rotate about said pivot into a folded position upon intentional folding for transportation or storage or folded as a result of an undesired collision or landing of the rotary wing aircraft;
said horizontal surface of said aircraft frame defining a frame support extending from a proximal end to a distal end; and
said projection extends from said distal end of said frame support.

2. A folding device as set forth in claim 1, wherein said projection extends from said aircraft frame and said detent is defined in said arm.

3. A folding device for an aircraft, comprising:
an aircraft frame having a horizontal surface;
a frame pivot aperture defined in said horizontal surface of said aircraft frame;
an arm extending between an inner end and an outer end;
an arm pivot aperture located in said inner end of said arm;
said outer end of said arm adapted to mount a driven propeller;
a pivot extending through said frame pivot aperture and said arm pivot aperture for pivotably mounting said arm to said aircraft frame;
a projection extending from one of said aircraft frame and said arm;
a detent located on the other of said aircraft frame and said arm;

a resilient mounting for mounting one of said detent and said projection for enabling said projection to resiliently engage said detent for securing said arm in a desired orientation relative to said aircraft frame and for enabling said arm to rotate about said pivot into a folded position;

a U-shaped slot located in said horizontal surface of said aircraft frame defining a frame support extending from a proximal end to a distal end; and said distal end of said frame support made flexible for defining said resilient mounting.

4. A folding device as set forth in claim 3, wherein said frame support is integral with said aircraft frame as a one-piece unit.

5. A folding device as set forth in claim 1, wherein the frame is made of carbon fiber structure.

6. A folding device for an aircraft, comprising:
an aircraft frame having a horizontal surface;
a frame pivot aperture defined in said horizontal surface of said aircraft frame;
an arm extending between an inner end and an outer end;
an arm pivot aperture located in said inner end of said arm;
said outer end of said arm adapted to mount a driven propeller;
a pivot extending through said frame pivot aperture and said arm pivot aperture for pivotably mounting said arm to said aircraft frame;
a projection extending from one of said aircraft frame and said arm;

a detent located on the other of said aircraft frame and said arm; and a resilient mounting for mounting one of said detent and said projection for enabling said projection to resiliently engage said detent for securing said arm in a desired orientation relative to said aircraft frame and for enabling said arm to rotate about said pivot into a folded position upon intentional folding for transportation or storage or folded as a result of an undesired collision or landing of the rotary wing aircraft;

a U-shaped slot located in said horizontal surface of said aircraft frame defining a frame support extending from a proximal end to a distal end;

said U-shaped slot being formed from a material to establishes said distal end of said frame support for defining said resilient mounting; and said projection extending from said distal end of said frame support.

7. A folding device as set forth in claim 1, wherein said detent is defined in said inner end of said arm; and
an arcuate recess disposed adjacent to said detent for facilitating rotation of said arm about said pivot.

8. A folding device as set forth in claim 1, wherein said detent is defined in said inner end of said arm; and
a first and a second arcuate recess disposed on opposed sides of said detent for facilitating rotation of said arm about said pivot.

9. A folding device as set forth in claim 1, including a detent plate for defining said detent.

* * * * *